R. F. RASMUSSEN.
CARRIER.
APPLICATION FILED SEPT. 15, 1921.
1,430,186. Patented Sept. 26, 1922.
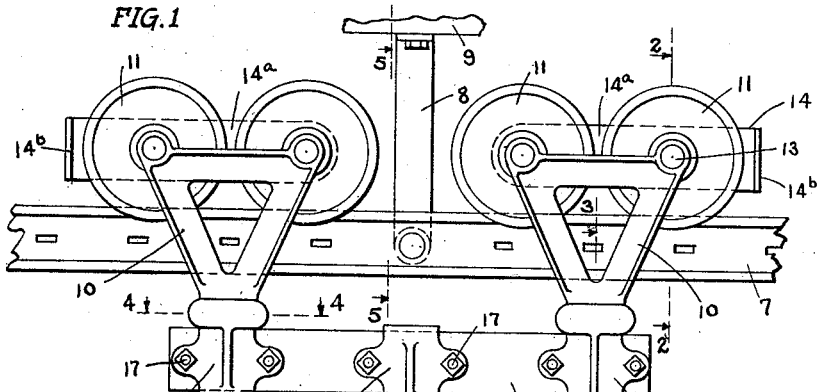
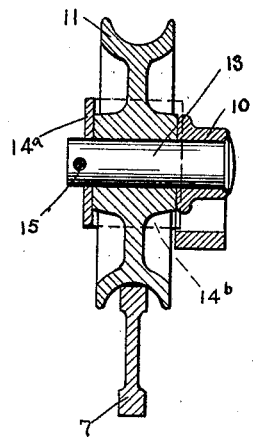
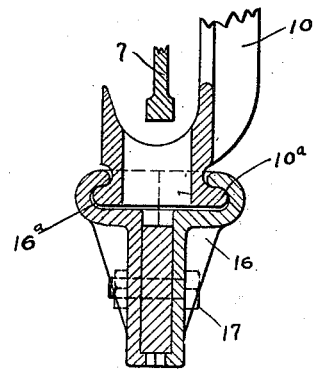
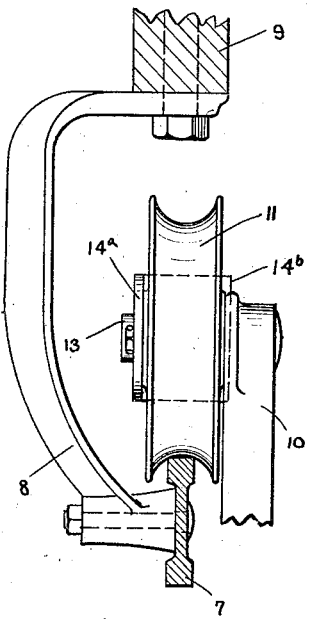
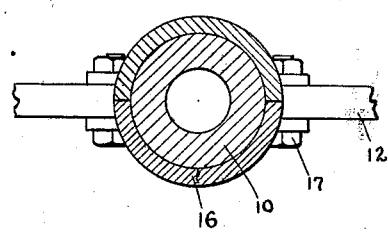
INVENTOR.
Robert F. Rasmussen,
BY
Morsell + Keeney,
ATTORNEYS.

Patented Sept. 26, 1922.

1,430,186

UNITED STATES PATENT OFFICE.

ROBERT F. RASMUSSEN, OF OSHKOSH, WISCONSIN, ASSIGNOR TO C. A. LIBBEY COMPANY, OF OSHKOSH, WISCONSIN, A CORPORATION OF WISCONSIN.

CARRIER.

Application filed September 15, 1921. Serial No. 500,784.

*To all whom it may concern:*

Be it known that I, ROBERT F. RASMUSSEN, a citizen of the United States, and resident of Oshkosh, in the county of Winnebago and State of Wisconsin, have invented new and useful Improvements in Carriers, of which the following is a description, reference being had to the accompanying drawings, which are a part of this specification.

This invention relates to improvements in carriers, particularly adapted for use in conveying a litter carrier from one part of a barn or farmyard to another, or, for conveying a receptacle of coal, building material or the like from one part of a yard to another.

Carriers of this general type operate on a single overhead track which can only be supported from one side by brackets. The track frequently runs out of doors and is often curved sharply to get around various obstructions. Under heavy loads and varying climatic conditions, the track frequently warps and twists out of its original shape. One of the objects of the invention is to provide a carrier of such construction that it will readily accommodate itself to abrupt curves or inequalities in the track so that the tendency for the carrier to jump off the track is reduced to a minimum.

In its preferred form the invention contemplates a pair of supporting brackets on each of which a pair of rollers adapted to engage the overhead track are mounted, a load carrying member or bar being connected to the lower ends of the supporting brackets; and a more specific object of the invention is to provide a novel form of swivel connection between the load carrying member and the supporting brackets, this preferably being accomplished by providing an annular flange on the lower ends of the brackets and a pair of clamping members fixed to the load carrying member adjacent each bracket and which have an annular groove adapted to receive the annular flange of the brackets, whereby the brackets may oscillate about their vertical axes relative to the load carrying bar.

A further object of the invention is to provide a load carrying member, preferably in the form of a hook, swivelly connected to the load carrying bar, the hook member preferably being connected to the bar in the same manner as the supporting brackets are connected thereto.

A further object of the invention is to provide stop members at the front and rear ends of the carrier which are of such construction that they will prevent breakage of the carrier and will absorb a certain amount of shock should the carrier run into some obstruction, for example, another carrier on the track, the stop members preferably being of L shape and mounted on the extremities of the pins on which the rollers carried by the supporting brackets are mounted, which arrangement not only provides a stop member, but also prevents spreading of the free ends of the roller carrying pins and rigidifies the structure.

The invention consists in the novel constructions, arrangements and devices to be hereinafter described and claimed for carrying out the above stated objects and such other objects as will appear from the following description of a certain preferred embodiment illustrated in the accompanying drawings, wherein—

Fig. 1 is a side elevational view of a carrier embodying the principles of the invention; and Figs. 2, 3, 4 and 5 are sectional views, on an enlarged scale, taken on the lines 2—2, 3—3, 4—4, and 5—5, respectively, of Fig. 1.

Like characters of reference designate like parts in the several views.

Referring to the drawings, it will be seen that the carrier is mounted upon a single overhead track, preferably in the form of an I-beam 7, fixed to the lower ends of supporting brackets 8, the upper ends of which are secured to suitable supports 9, only one of such brackets and supports being shown in the drawings.

The carrier comprises a pair of bracket members 10 on the upper ends of which are mounted rollers 11 adapted to run upon the track 7, the lower ends of said brackets being swivelly connected to a load carrying bar 12. Two rollers are preferably provided for each bracket, as shown in Fig. 1, the rollers being journaled on pins 13 which are mounted in and project from suitable bearings provided in the brackets. After the rollers have been mounted on the pins, the perforated portion 14ª of an L-shaped member 14 is slipped over the extremities of the pins and secured in place by cotter pins 15 which extend through the pins. By this arrangement the pins associated with each bracket are maintained in parallel arrangement at all times and the rollers are not subjected to any binding action which might otherwise occur if the extremities of the pins were not tied together as described. The portions 14$^b$ of the members 14 are bent around substantially at right angles to the respective portions 14$^a$, and, as clearly shown in Fig. 1, the portions 14$^b$ extend across the track both at the front and the rear of the carrier, thus forming a somewhat resilient stop for the carrier in case it should encounter an obstruction on the track or when it strikes against the end post of the track.

The swivel connections between the brackets 10 and the load carrying bar 12 are preferably formed by providing a pair of oppositely disposed clamping members 16 rigidly secured to the bar 12 adjacent each end thereof by bolts 17, the members 16 being formed so as to provide an annular groove 16$^a$ adapted to receive an annular flange 10$^a$ provided on the lower end of each of the brackets 10. This arrangement permits a certain amount of oscillation of the brackets 10 about their vertical axes relative to the bar 12 and permits the carrier to accommodate itself readily to abrupt curves or inequalities in the track.

A hook member 18 is preferably swivelly mounted on the bar 12 intermediate the clamping members 16, the preferred arrangement being to provide a third pair of clamping members 16 identical in construction to those just described and which are adapted to embrace an annular flange 18$^a$ formed on the upper end of the hook 18.

I claim:

1. A carrier of the class described comprising a pair of brackets, a roller mounted on each of said brackets, each bracket at its lower end having an annular flange, a load carrying member, and a pair of clamping members fixed to said carrying member adjacent each end, said clamping members having annular grooves adapted to receive the flanges of said respective brackets for the purpose described.

2. A carrier of the class described comprising a pair of brackets, a roller mounted on each of said brackets, each bracket at its lower end having an annular flange, a load carrying member, a pair of clamping members fixed to said carrying member adjacent each end, said clamping members having annular grooves adapted to receive the flanges of said respective brackets, a second load carrying member having at its upper end an annular flange, and a pair of clamping members fixed to said first mentioned carrying member intermediate said first mentioned pairs of clamping members and having an annular groove adapted to receive the flange of said second mentioned carrying member, for the purpose described.

3. A carrier of the class described comprising a pair of brackets, a roller mounted on each of said brackets, a load carrying member connected to said brackets, and an L-shaped resilient stop member associated with each of said brackets.

4. A carrier of the class described comprising a pair of brackets, a pair of rollers associated with each of said brackets, pins projecting from one side of said brackets on which the rollers are journaled, a load carrying member connected to said brackets, and an L-shaped resilient member mounted on the extremities of each set of pins, for the purpose described.

In testimony whereof, I affix my signature.

ROBERT F. RASMUSSEN.